(12) United States Patent
Moran et al.

(10) Patent No.: US 6,414,076 B1
(45) Date of Patent: Jul. 2, 2002

(54) METHOD OF PREDETERMINING THE GLOSS OF PVC COMPOUNDS

(75) Inventors: Michael T. Moran, Reading; Thomas E. Moses, Schwenksville; John D. Oister, Pottstown, all of PA (US)

(73) Assignee: Occidental Chemical Corporation, Dallas, TX (US)

( * ) Notice: Subject to any disclaimer, the term of this patent is extended or adjusted under 35 U.S.C. 154(b) by 0 days.

(21) Appl. No.: 09/617,339

(22) Filed: Jul. 17, 2000

(51) Int. Cl.[7] ............................................. C08L 27/06
(52) U.S. Cl. ...................... 524/569; 524/292; 524/296; 524/297; 524/298; 524/527; 524/567; 524/569; 525/239
(58) Field of Search .................. 524/296, 297, 524/298, 567, 569, 292, 527; 525/239

(56) References Cited

U.S. PATENT DOCUMENTS 4,914,154 A * 4/1990 Haller et al. ................. 525/239
4,978,718 A * 12/1990 Haller et al. ................. 524/527

FOREIGN PATENT DOCUMENTS

| CH | 457 822 | * | 10/1967 |
| DE | 25 20 229 | * | 11/1976 |
| DE | 32 31 906 | * | 3/1984 |
| EP | 0 104 433 | * | 3/1984 |

* cited by examiner

Primary Examiner—Peter Szekely
(74) Attorney, Agent, or Firm—Richard D. Fuerle; Joseph D. Yao

(57) ABSTRACT

A method of making an article from polyvinyl chloride compound that has a predetermined amount of gloss is disclosed. Samples of the resin are prepared that have different molecular weight distributions. Articles are made from the samples and the gloss of the articles is measured. The relationship between the molecular weight distributions of the samples and the gloss of the articles made therefrom is determined. From that relationship, an article is made from a resin selected such that its molecular weight distribution corresponds to the predetermined amount of gloss.

20 Claims, 4 Drawing Sheets

METHOD OF PREDETERMINING THE GLOSS OF PVC COMPOUNDS

BACKGROUND OF THE INVENTION

This invention relates to a method of predetermining the gloss of a polyvinyl chloride (PVC) compound. In particular, it relates to preparing samples of a PVC compound having different molecular weight (MW) distributions, making articles from the samples, measuring the gloss of the articles, determining the relationship between the MW distribution and the gloss, and selecting a MW distribution from that relationship that will give the desired gloss.

PVC articles are made by molding PVC powders and plastisols. To enhance the appearance of the articles, manufacturers want to be able to control their gloss, so that their surfaces are as shiny or dull as desired. Gloss can be controlled by mixing PVC powders of different particle size distributions and by incorporating specialty resins or gloss control additives into the resin. These methods increase the cost of the materials needed to make the article and the number and complexity of the steps in the manufacturing process.

SUMMARY OF THE INVENTION

We have discovered that the gloss of articles made from mixtures of two PVC resins of different MWs falls to a minimum then increases again as the ratio of the resins in the mixture changes from 100% of one resin to 100% of the other resin. Remarkably, the minimum gloss is less than the gloss of articles prepared from 100% of either of those two resins. These results are surprising because it was expected that the gloss of articles made from such mixtures would be linearly proportional to the amount of each resin in the mixture (with the end points being the gloss of 100% of either resin). Because of this discovery, it is now possible to achieve a predetermined amount of gloss without using different particle size distributions, specialty resins, or gloss control additives.

DESCRIPTION OF THE PREFERRED EMBODIMENTS

Figure 1:
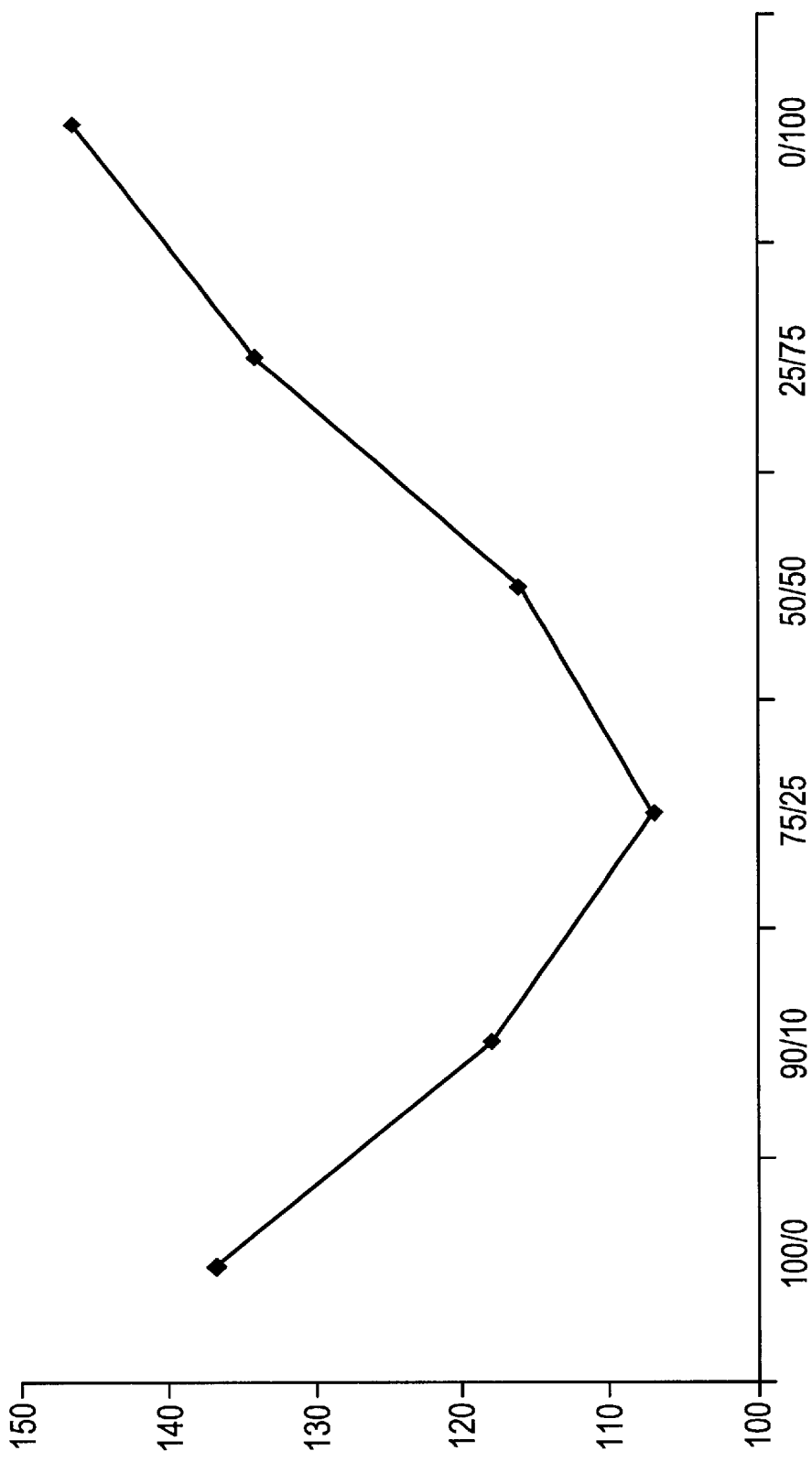
FIG. 1 is a graph giving the results of Example 1, where the ordinate is 60 degrees gloss and the abscissa is the ratio of the higher MW resin to the lower MW resin.

This invention is applicable to any PVC compound. The PVC resin used in the PVC compound can be a homopolymer or a copolymer containing up to 15 wt % of another monomer, such as a vinylacetate, maleate, or acrylate. The resin, a powder, can have a particle size from about 0.1 to about 200 microns; a preferred particle size is about 0.2 to about 2 microns. The resin is used to make PVC compounds, such as plastisols, organosols, or aquasols, by the inclusion of various additives such as plasticizers, diluents, thermal stabilizers, pigments, fillers, and specialty surfactants. Examples of plasticizers that can be used include phthalates, dibenzoates, polymerics, and trimellitates.

An article made from a PVC compound that has a predetermined amount of gloss on its surface can be made according to a method of this invention. First, it is necessary to determine the relationship between the MW distributions of the resins one wishes to use and the amount of gloss on a surface of an article made from compounds containing those resins. This can be done by preparing at least two samples of compounds made from resins having different MW distributions. About 2 to about 5 samples are preferred, but more samples may be needed under particular circumstances. The samples can be prepared by mixing various ratios of two resins that have different MWs, where the two resins are otherwise chemically the same or chemically different (i.e., the surfactants in the resins are different or a different amount of an surfactant is used). Samples can also be prepared by blending latices of different MWs to make a single dispersion resin.

The greater is the difference between the MWs of the two resins (i.e., the wider the MW distribution of the mixture of the two resins), the greater will be the maximum decrease in the gloss of the article. To express this another way, if two resins of different MWs are mixed, the resulting MW distribution will be bimodal (or unimodal with a higher dispersity) and the gloss of the article will decrease as the distance between the peaks of the two modes increases (or as the polydispersity increases). For example, compared to the minimum gloss of either resin in the mixture, a difference in the peak MWs of two resins of only about 5 K (where "K" means the K value, which is a measure of MW) may decrease the gloss of the article 10 gloss units at the minimum gloss, but a difference in peak MWs of about 20 K may decrease the gloss of the article 40 gloss units at the minimum gloss. Best results are achieved if the two resins differ in MW by at least about 5 K and preferably at least about 12 K.

While samples made by mixing two resins of different MWs in increasing 15 ratios of one resin to the other resin will not have two peaks at various distances apart, the size of the two peaks will change from a high peak and a low peak to equal peaks to a low peak and a high peak, which means that the standard deviation of the MW distribution will increase to a maximum, then decrease again. (With most commercial PVC resins, the standard deviation will increase, but two distinct peaks will not be discernable.) Since the maximum decrease in gloss is usually at a weight ratio of higher MW resin to lower MW resin between about 1 and about 20, samples can advantageously be prepared that include at least one ratio within that range.

Articles are then made from the samples, by casting a film or by a molding process such as die molding or cavity molding. The gloss on a surface of the articles is measured, for example, by using a gloss meter. The resulting data can be arranged on a graph using Cartesian coordinates with the ratio of the two resins in the mixture gradually increasing on one coordinate and the gloss at a ratio tested given on the other coordinate. The data points can be joined, for example, by hand or by mathematically fitting a curve to them, to give the relationship between MW distribution and gloss. The gloss is inversely related to the width of the MW distribution. That is, the gloss decreases as the standard deviation of the MW distribution increases, except that the maximum decrease in gloss may not coincide with the maximum standard deviation of the MW distribution. As illustrated by the drawings, the relationship is a U-shaped curve where the gloss decreases as the ratio of the lower MW resin to the higher MW resin increases, then increases again after reaching a minimum at a particular ratio. The curve can be approximately fitted to the equation $c(x-R)^2=y-m$, where x is the ratio of the higher MW resin to the lower MW resin, y is the gloss, R is the ratio of the higher MW resin to the lower MW resin at the minimum gloss, m is the minimum gloss, and c is a constant. Once this relationship is determined, one can select the amount of gloss desired, then, from the curve, find the (usually) two ratios of the two resins that give that amount of gloss, and use one of those ratios to make articles having the desired amount of gloss.

Since the MW distribution of the resin may affect properties of the compound in addition to its gloss, it may be desirable to alter the MW distribution no more than is necessary to achieve the desired amount of gloss. This can be accomplished by reducing the difference between the MWs of the two resins (i.e., reducing the standard deviation of the MW distribution) until the desired gloss is the minimum gloss.

The following examples further illustrate this invention. The resins used in the examples are made and sold commercially by Occidental Chemical Corporation. The following table gives the MW of the resins:

| Resin | MW(K) |
|---|---|
| "Oxy 80HC" | 80 |
| "Oxy 75HC" | 75 |
| "Oxy 68HC" | 68 |
| "Oxy 605" | 62 |
| "Oxy 625" | 67 |

EXAMPLE 1

Six PVC compounds were prepared by mixing various ratios of two PVC resins, "Oxy 80HC" and "Oxy 68HC," which are chemically-identical but have different MWs. The formulations used were 100 parts by weight (pbw) resin in the ratios given in FIG. 1, 50 pbw phthalate plasticizer, 5 pbw aliphatic diluent, and 3 pbw thermal stabilizer. Films were cast and fused on a glass plate at 200° C. The gloss of the films was determined using a Byk Gardener micro Trigloss meter. FIG. 1 gives the results and shows that the minimum gloss occurred at a ratio of the higher to the lower MW resin of about 75/25.

EXAMPLE 2

Figure 2:
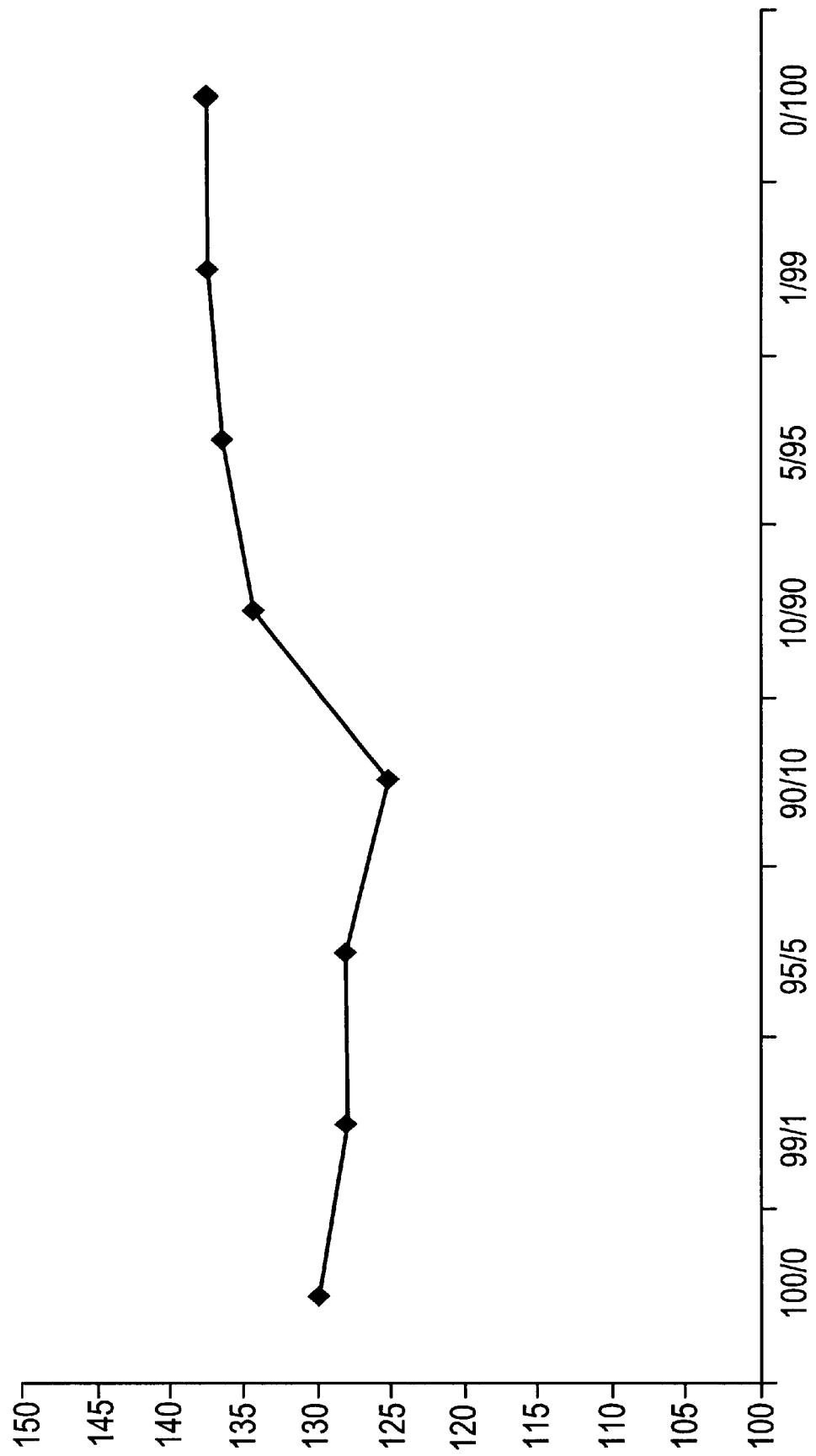
FIG. 2 is a graph giving the results of Example 2, where the ordinate is 60 degrees gloss and the abscissa is the ratio of the higher MW resin to the lower MW resin.

Example 1 was repeated using two chemically-identical PVC resins with less difference in MW, "Oxy 80HC" and "Oxy 75HC." FIG. 2 gives the results and shows that the gloss is reduced by 5 points at a 90:10 ratio of "Oxy 80HC" to "Oxy 75HC." Comparing FIGS. 1 and 2 shows that the decrease in gloss was greater when the difference between the MWs of the two resins was greater.

EXAMPLE 3

Figure 3:
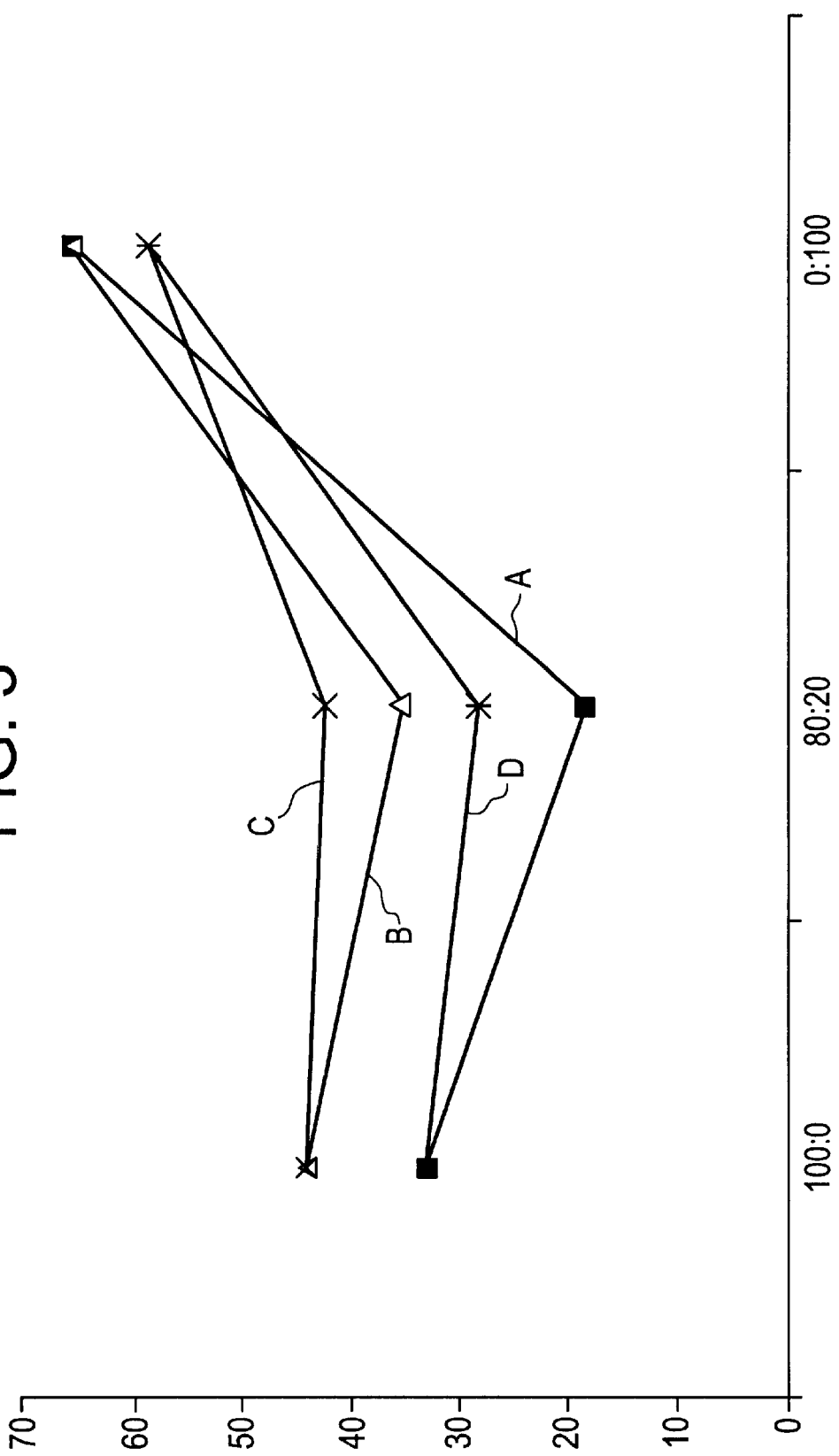
FIG. 3 is a graph giving the results of Example 3, where the ordinate is gloss and the abscissa is the ratio of the higher MW resin to the lower MW resin.

Example 1 was repeated using two chemically-different PVC resins, except that 20 pbw of "Oxy 567," a blending resin, was used in the compounds. In Curve A the dispersion resins were "Oxy 80HC" and "Oxy 605"; in Curve B the dispersion resins were "Oxy 75HC" and "Oxy 605"; in Curve C the dispersion resins were "Oxy 75HC" and "Oxy 68HC"; and in Curve D the resins were "Oxy 80HC" and "Oxy 68HC." Films were cast and fused on a black/white Leneta Card at 200° C. FIG. 3 gives the results and shows that a minimum gloss occurred as before.

EXAMPLE 4

Figure 4:
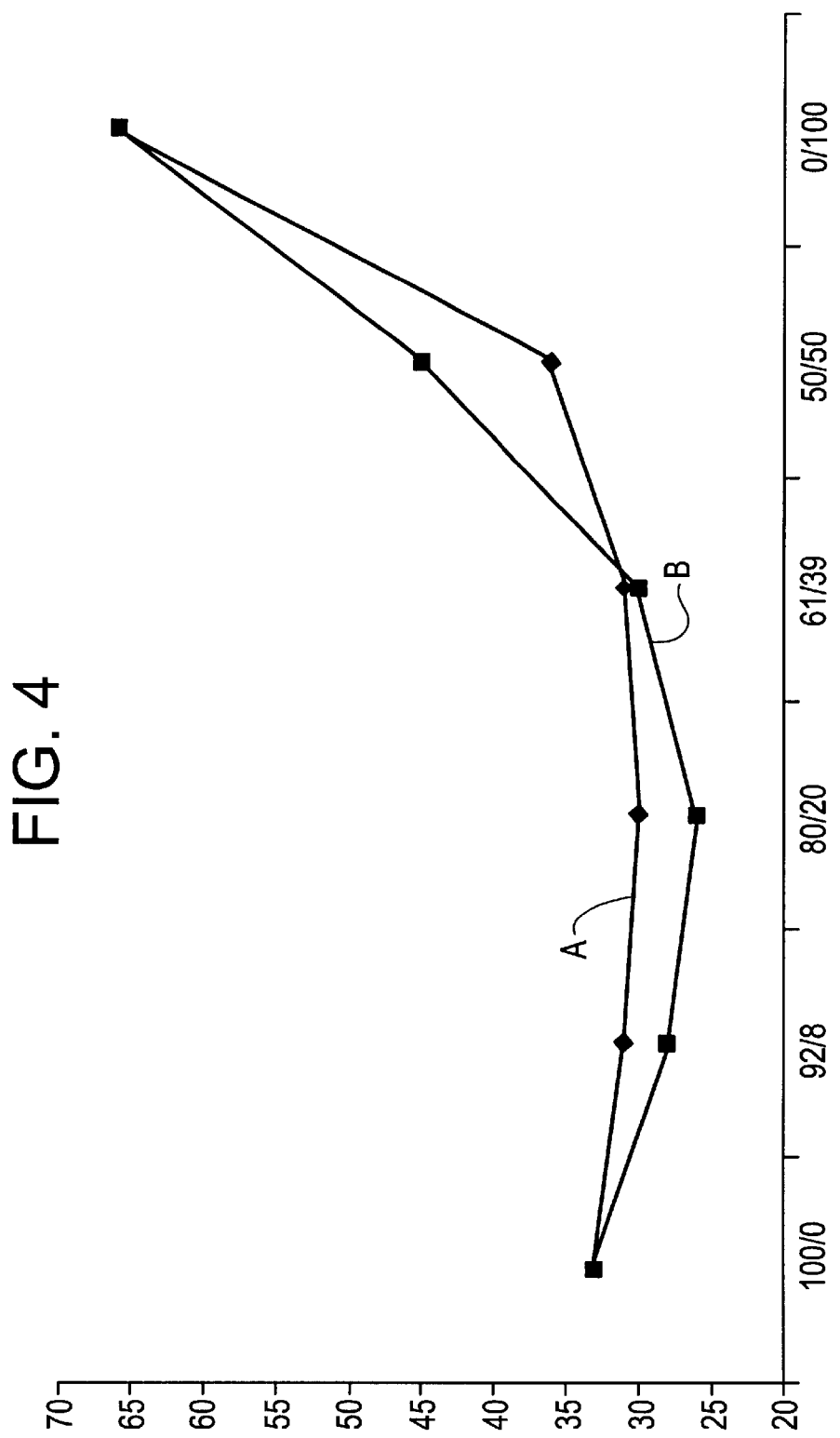
FIG. 4 is a graph giving the results of Example 4, where the ordinate is gloss and the abscissa is the ratio of the higher MW latex to the lower MW latex.

Example 3 was repeated using single dispersion PVC resins made by blending latices of different K values,.except that 20 pbw of "Oxy 567" was used in these compounds. FIG. 4 gives the results. In Curve A, the resins were "Oxy 80HC" and "Oxy 625" and in Curve B, the dispersion resins were "Oxy 80HC" and "Oxy 605." FIG. 4 shows that producing a single dispersion resin having a wide MW distribution has the same effect as blending dry resins having different MWs. FIG. 4 also shows that the greatest reduction in gloss occurs when the difference between the MWs of the resins used is the greatest.

We claim:

1. A method of making an article from polyvinyl chloride, where said article has a predetermined amount of gloss comprising
   (A) preparing at least two samples in different ratios from
      (1) a first polyvinyl chloride having a molecular weight of x K; and
      (2) a second polyvinyl chloride having a molecular weight of y K, where x is greater than y and x−y is at least 5, where all of said sample comprise
         (a) compounds of dispersion resins or
         (b) latices;
   (B) making articles from said samples by fusing said first polyvinyl chloride and said second polyvinyl chloride in said samples;
   (C) measuring the gloss of said articles;
   (D) determining the relationship between the ratios used in said samples and the gloss of articles made therefrom; and
   (E) using said relationship, making an article from said first polyvinyl chloride and said second polyvinyl chloride in a ratio that corresponds to said predetermined amount of gloss.

2. A method according to claim 1 wherein said first polyvinyl chloride and said second polyvinyl chloride are compounds of dispersion resins.

3. A method according to claim 2 wherein at least one of said samples has a weight ratio of the higher molecular weight resin to the lower molecular weight resin between 1 and 20.

4. A method according to claim 2 wherein the difference between the molecular weights of said two resins is at least 12 K.

5. A method according to claim 2 wherein said two resins are chemically-identical, except for their molecular weights.

6. A method according to claim 2 wherein said two resins are chemically-different, in addition to their molecular weights.

7. A method according to claim 1 wherein said first polyvinyl chloride and said second polyvinyl chloride are latices.

8. A method according to claim 1 wherein said articles contain a phthalate, dibenzoate, polymeric, or trimellitate plasticizer.

9. A method according to claim 1 wherein said predetermined amount of gloss is the minimum amount of gloss in said relationship.

10. A method according to claim 1 wherein about 2 to about 5 samples are prepared.

11. A method of making an article having a predetermined amount of gloss from two plasticized polyvinyl chloride resins comprising
   (A) preparing at least two samples of mixtures in different ratios of two plasticized polyvinyl chloride resins that differ in molecular weight by at least 12 K;

(B) making an article from each of said samples by fusing said two plasticized polyvinyl chloride resins;

(C) measuring the gloss of said articles;

(D) determining the relationship between said ratios and the gloss of said articles; and (E) making an article from a mixture of said two plasticized polyvinyl chloride resins in a ratio that said relationship indicates corresponds to said predetermined amount of gloss, where the gloss of the article prepared in this step is less than the gloss of an article prepared from either one of said two plasticized polyvinyl chloride resins.

12. A method according to claim 11 wherein about 2 to about 5 samples are prepared.

13. A method according to claim 11 wherein at least one of said samples has a weight ratio of the higher molecular weight resin to the lower molecular weight resin between 1 and 20.

14. A method according to claim 1 wherein said predetermined amount of gloss is the minimum amount of gloss in said relationship.

15. A method according to claim 11 wherein, except for molecular weight, said two resins are chemically identical.

16. A method according to claim 11 wherein, in addition to molecular weight, said two resins are chemically different.

17. A method of making an article having a predetermined amount of gloss from two polyvinyl chloride latices, comprising (A) preparing at least two samples of mixtures in different ratios of two latices that contain polyvinyl chloride dispersion resins that differ in molecular weight by at least 12 K;

(B) making an article from each of said samples by preparing dispersion resins and compounds from said latices and fusing said dispersion resins in said compounds;

(C) measuring the gloss of said articles;

(D) determining the relationship between said ratios and the gloss of said articles; and (E) making an article from a mixture of said two latices in a ratio that said relationship indicates corresponds to said desired amount of gloss, where the article prepared in this step has a predetermined amount of gloss that is less than the gloss of an article prepared from either one of said latices.

18. A method according to claim 17 wherein about 2 to about 5 samples are prepared.

19. A method according to claim 17 wherein at least one of said samples has a weight ratio of the higher molecular weight resin to the lower molecular resin between 1 and 20.

20. A method according to claim 17 wherein said predetermined amount of gloss is the minimum amount of gloss.

* * * * *